United States Patent [19]
Hahn et al.

[11] Patent Number: 5,224,582
[45] Date of Patent: Jul. 6, 1993

[54] CHANNEL SECTIONS FOR SCRAPER-CHAIN CONVEYORS

[75] Inventors: Detlef Hahn; Bernd Steinkuhl, both of Lunen, Fed. Rep. of Germany

[73] Assignee: Gewerkschaft Eisenhutte Westfalia GmbH, Fed. Rep. of Germany

[21] Appl. No.: 662,254

[22] Filed: Feb. 28, 1991

[30] Foreign Application Priority Data

Mar. 1, 1990 [DE] Fed. Rep. of Germany ....... 4006183

[51] Int. Cl.⁵ .............................................. B65G 19/18
[52] U.S. Cl. ................................. 198/735.6; 198/861.2
[58] Field of Search ............... 198/735.2, 735.6, 860.2, 198/861.1, 861.2

[56] References Cited

U.S. PATENT DOCUMENTS

| | | | |
|---|---|---|---|
| 2,818,164 | 12/1957 | Dommann | 198/735.6 X |
| 4,157,751 | 6/1979 | Grundken et al. | 198/735.2 |
| 4,373,757 | 2/1983 | Gehle et al. | 198/735.6 X |
| 4,444,304 | 4/1984 | Redder et al. | 198/735.2 |
| 4,637,510 | 1/1987 | Tomlinson | 198/735.6 X |
| 4,667,811 | 5/1987 | Schoop et al. | 198/735.6 X |

FOREIGN PATENT DOCUMENTS

| | | | |
|---|---|---|---|
| 0570024 | 7/1961 | Belgium | 198/735.2 |
| 3324108 | 1/1985 | Fed. Rep. of Germany | |

Primary Examiner—Joseph E. Valenza
Assistant Examiner—Tuan N. Nguyen
Attorney, Agent, or Firm—Samuels, Gauthier & Stevens

[57] ABSTRACT

A conveyor channel section has shaped side walls composed of superimposed rolled profiled strips identical in construction and shape A floor plate extends between the side walls and projects between inclined curved wall portions of upper and lower profiled strips. Longitudinal welds join the floor plate to the ends of the wall portions The wall portions merge with flanges extending inwardly of the floor plate and with ribs extending in an opposite direction outwardly of the floor plate at the level of the flanges. Spill plate holders are welded to the exteriors of the side walls between the ribs and connectors at the ends of the side walls permit adjacent channel sections to be joined together with the aid of coupling members.

16 Claims, 3 Drawing Sheets

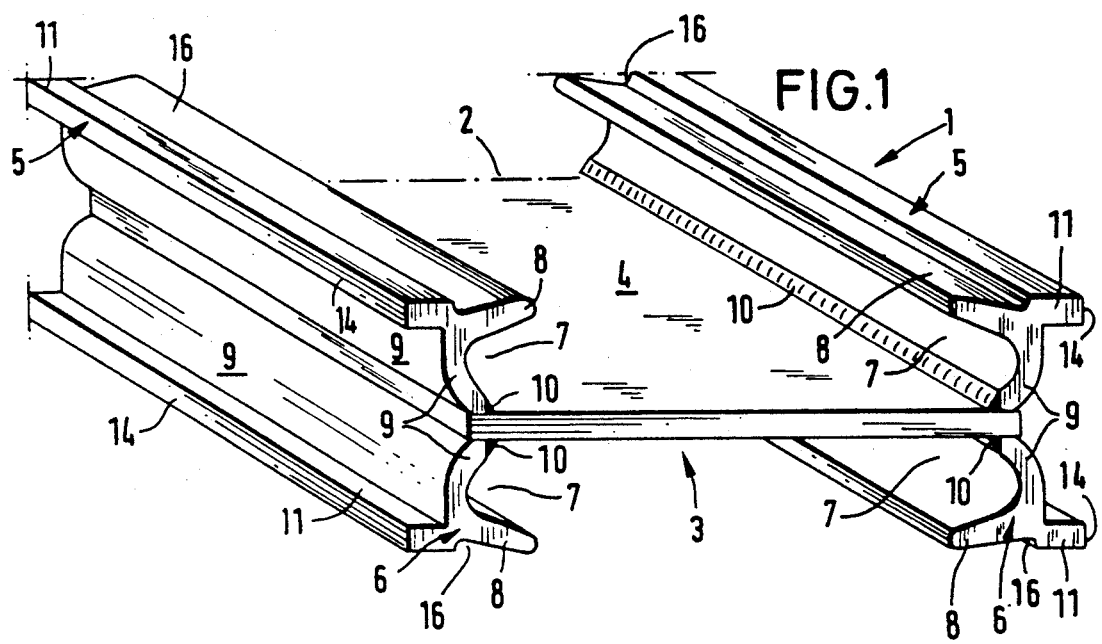
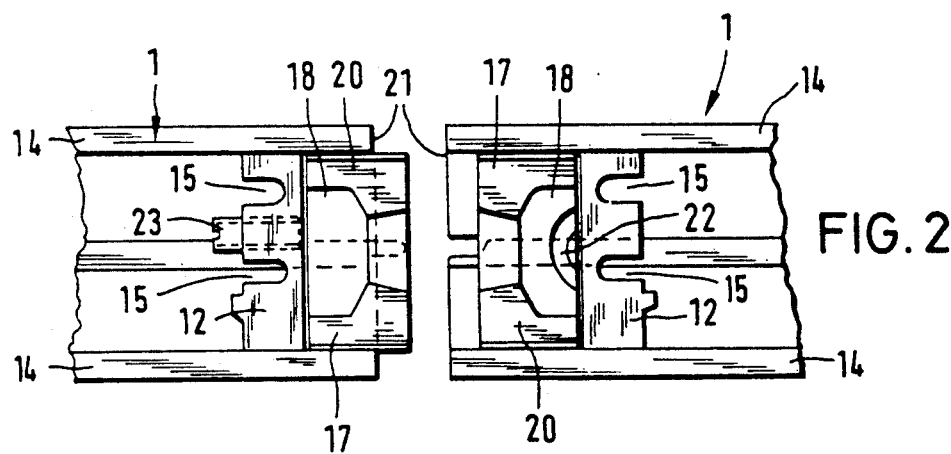
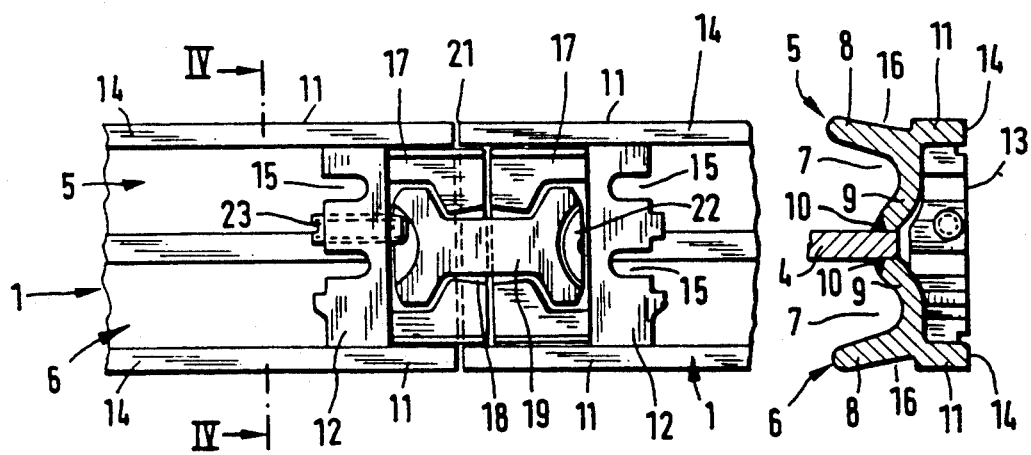
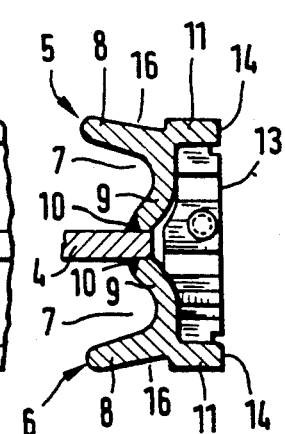

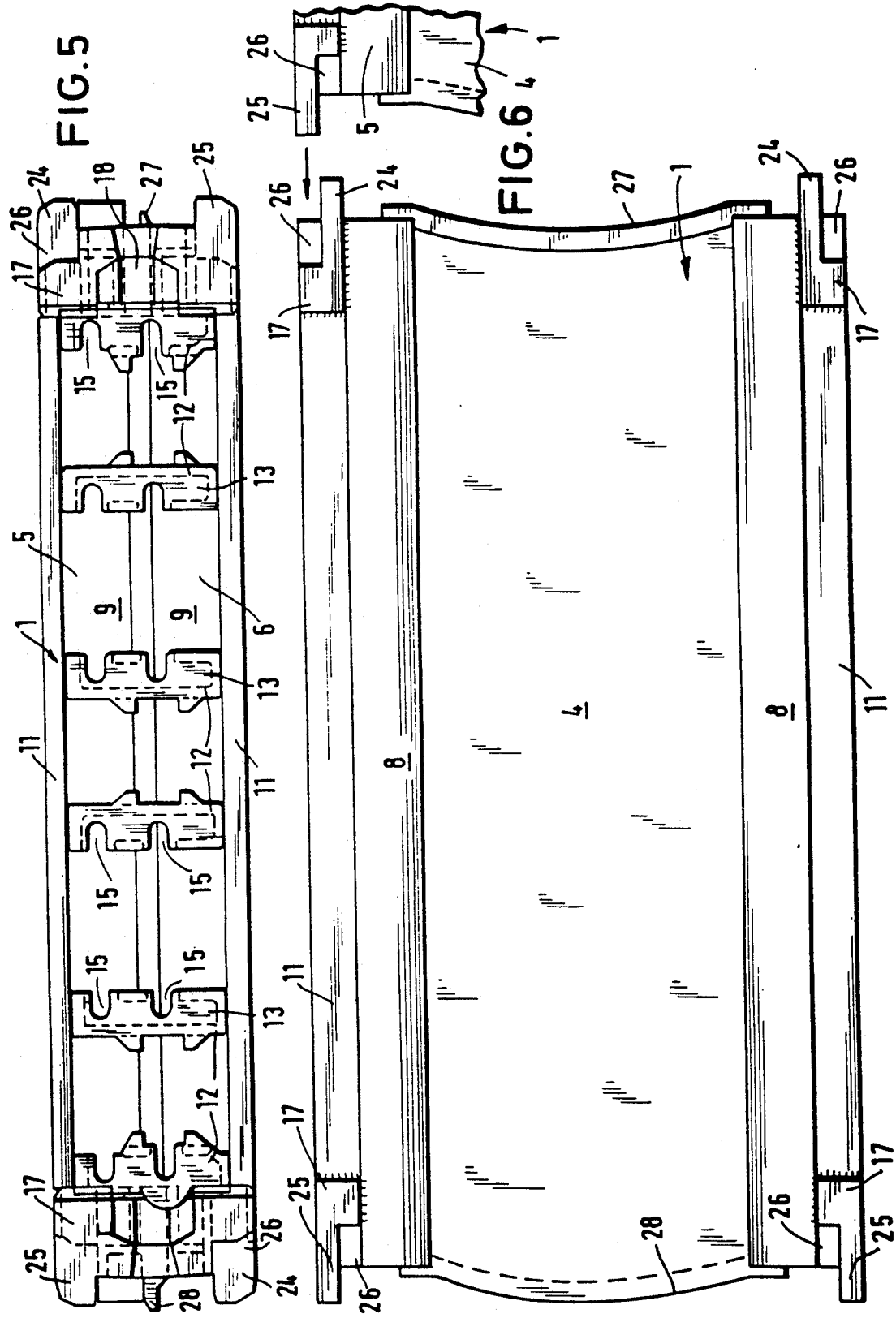

5,224,582

CHANNEL SECTIONS FOR SCRAPER-CHAIN CONVEYORS

FIELD OF THE INVENTION

The present invention relates in general to scraper-chain conveyors and more particularly to the channel sections or pans of such conveyors.

BACKGROUND OF THE INVENTION

The conveyor troughs or pans of conventional scraper-chain conveyors, as used in particular in mining operations, consist of individual pans which are connected to one another in a tension-resistant manner at the ends, for example via toggle joints, with clearance such that they can perform certain angular movements in the horizontal and vertical with respect to one another. It is normal to use for the side walls of the pans, single-piece rolled sections which have, between their upper and lower flange, an intermediate flange to which the floor plate or tray over which material is conveyed is connected by welding. With the floor plate, the side walls form guide channels in which the scrapers are guided in the conveying upper run and in the lower return run of the conveyor.

Fittings of various types, such as elevated spill plates, guide bars, plough or cutter guides and the like, are often attached to the side walls of the pans used in mining.

The invention is based on a pan of the type known from DE-OS 33 24 108 and DE-OS 33 35 057. In these known pans, the side walls each consist of two superimposed, optionally identically constructed, U-shaped profiled strips which rest on one another with their profiled flanges. The conveying floor plate is welded to the profiled flanges of the profiled strips. The profiled strips, superimposed in pairs, can be welded to one another at their contacting flanges. The thickness of the floor plate adopted depends on the thickness of the abutting flanges of the profile strips. The use of a U-shaped rolled shape for the profiled strips results in relatively great weight. Any spill plates welded externally on the external faces of the profiled strips, also lead to an increase in weight and, furthermore, to an increase in the overall width of the pan.

A general object of the invention is to construct a pan such that it can be manufactured less expensive with the necessary high stability and low weight and, as far as possible, also reduced overall dimensions.

SUMMARY OF THE INVENTION

According to the invention, there is provided a channel section or pan with side walls and a floor plate extending therebetween Each side wall is composed of upper and lower profiled pieces of identical shape. Each profiled piece has an inwardly directed flange disposed outwardly from the floor plate and partly overlapping the floor plate together with an inclined wall portion projecting inwardly from the flange towards the floor plate. In accordance with the invention, the floor plate locates between the profiled pieces of each side wall with welded seams extending longitudinally of the pan joining the ends of the wall portions of the profiled pieces to the floor plate and the profiled pieces have outwardly projecting ribs substantially in alignment with the flanges. Connectors at the ends of the side walls enable the pan to be connected to another pan.

With a pan made in accordance with the invention, four profiled pieces arranged in pairs form the side walls and these components can be used in conjunction with floor plates of different thickness because the floor plate is located in the manner of a spacer between the superimposed profiled pieces. The clear height available in the upper and lower run of the pan, for the scrapers and the scraper chain, is not affected by the thickness of the conveying floor plate. As all four profiled pieces are identical to one another in construction, manufacture is considerably simplified and costa are reduced accordingly. If the side walls are sufficiently strong, they can be constructed with a reduced height, so the conveyor pan can receive a substantially reduced overall height with lower weight.

The profiled pieces preferably each have a curved wall portion which is directed inwardly toward to the floor plate and of which the free end forms a narrow weld-on foot. The weld seams can be located deep inside the guide channels for the scrapers if desired. The welding can also be carried out simply in terms of modern welding technology and with good strength of the welded joints.

The profiled pieces can be rolled sections reinforced in the regions expected to suffer wear. considerable additional reinforcement is achieved due to the external shape or rolled rib projections of the profiled pieces. The side walls are preferably additionally rigidified by separate welded-in spill-plate holders which fit between the ribs of the profiled pieces. As spill plates running over the pan length are not necessarily required on both sides of the pan further savings of weight and simplification in manufacture can be achieved.

The narrow spill-plate holders scan consist of drop foraging. similarly to the connectors used for pan interconnection.

All in all, the invention provides a pan which can be manufactured less expensively with the necessary high strength and stability and lower weight and optionally also with reduced overall dimensions.

The profiled pieces, which preferably consist of rolled sections shaped such that their wall portions are curved and run out from the flange to the free end welded to the floor plates, are such with the inclusion of the rib projections produces an approximately T-shaped top profile with a curved web wall portions which act as supports and welded-on arms. In the case of a pan without an exchangeable conveying trough, all the profiled pieces with their supporting arms or wall portions forming the weld-on feet can e welded to the conveying floor plane or tray with the weld seams lying, if desired, in the guide channels in the upper and lower run, in other words being set back relative to the free ends of the flanges of the side walls.

The flanges of the profiled pieces can be provided, on their upwardly and downwardly directed external faces with shaped relived or rolled shallow tapers which extend substantially from the projection of the strong flange strips toward the free flange ends, This may create a shoulder with each of the associated ribs. This measure results in a further reduction of weight while still allowing an extracting machine or the like to travel on the upper flanges.

Similarly to the spill-plate holders, according to a further advantageous feature of the invention, the connectors which serve for inter-pan connection and have laterally open bolt pockets for a coupling member or toggle joint can be welded at the pan ends between the superimposed rib projections of the trifled pieces in surface contact therewith. The components are preferably arranged such that the external faces of these connectors lie substantially in a common plane with the external end races of the ribs, that is. do not protrude laterally beyond the ribs. The connectors can also est against respective spill-plate holder. The connectors preferably make surface contact with the wall portions of the profiled pieces and Can fit snugly against the external contour thereof.

The components can also advantageously be arranged such that, at the inter-pan butt-joints. in each case, the connector of one pan protrude beyond the ends of their profile pieces while the connector of the other pan are set back accordingly relative to the ends of their profiled pieces and therefore form, between the superimposed ribs of the profiled pieces, spaces or pockets for receiving the protruding part of the complementary connector. This assists in lateral centering of the pans at the pan connections.

It is also possible to dimension the connectors in their height according to the height of the lateral profiles, in which case they are welded terminally on ends of the side walls as is known.

The rolled flange and ribs projections receive such a length that sufficiently strongly dimensioned spill-plate holders can be welded between them and sufficiently strongly dimensioned connectors as simultaneously rigidifying elements can preferably also be welded between them. without these parts protruding outwardly beyond the ribs of the profiled pieces.

With the holders, the screw connection of fittings such as spill-plates. extraction machine guides and the like is therefore facilitated as is known.

The invention may be understood more readily, and various other aspects and features of the invention may become apparent. from consideration of the following description.

BRIEF DESCRIPTION OF DRAWINGS

Embodiments of the invention will now be described, by way of examples only, with reference to the accompanying drawings, wherein:

FIG. 1 is a perspective view of part of a channel section or pan of a scraper chain conveyor constructed in accordance with the invention;

FIG. 2 is a side view of the end regions of a pair of separated pans constructed in accordance with the invention;

FIG. 3 is a side view of the pans shown in FIG. 2 when connected together;

FIG. 4 is a sectional end view of part of one of the pans the view being taken along the line IV—IV of FIG. 3;

FIG. 5 is a side view of a modified form of channel section or pan constructed in accordance with the invention;

FIG. 6 is a schematic plan view of the pan shown in FIG. 5;

DESCRIPTION OF PREFERRED EMBODIMENTS

Figure 7:
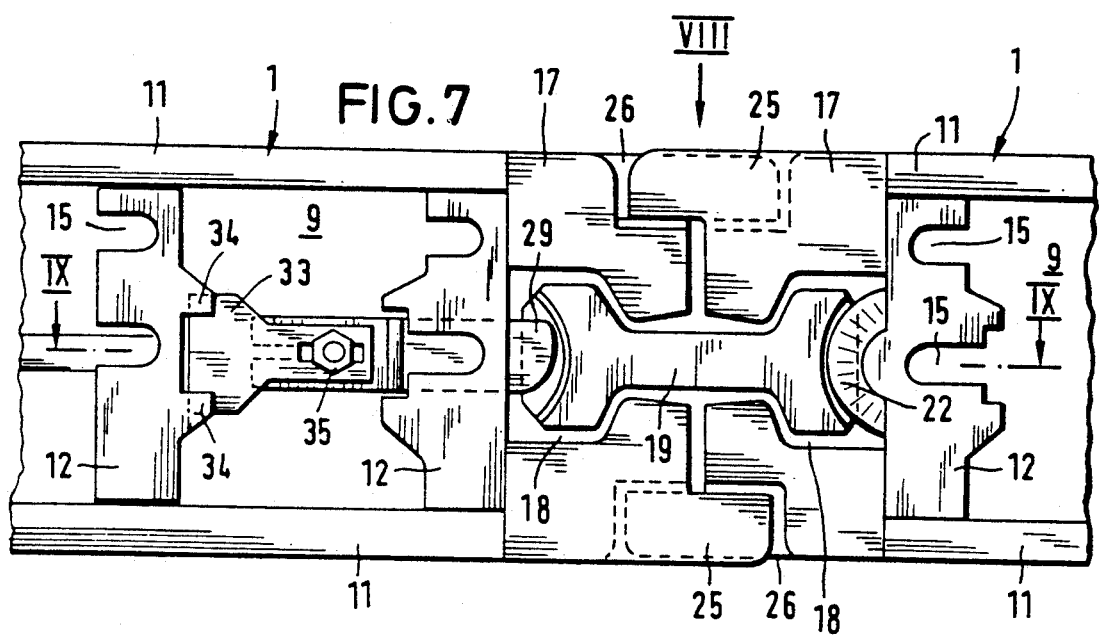
FIG. 7 is a side view of the end regions of a pair of pans shown in FIGS. 5 and 6 when connected together.

The channel sections or pans depicted in the drawings are intended for use in a scraper-chain conveyor with a scraper-chain assembly (not shown) of the inboard type, i.e. with a chain or chains running along the central region of the conveyor pan. As is known, the scrapers of the assembly are guided at their ends by guides defined by the side walls and floor of the pans. As is normal with such conveyors the pans are joined together in end-to-end relationship with the aid of connectors which resist tensile forces tending to pull the pans apart but which allow a certain degree of angular mobility between the ends of adjacent pans in both horizontal and vertical senses.

The pan shown in FIG. 1 and designated with reference numeral 1 is only shown over part of the length. The pan 1 is made from a symmetrical side walls welded to a stout floor plate 4. The floor plate 4 separates an upper run 2 from a lower run 3 of the associated scraper-chain assembly (not shown).

The side walls ar each composed of profiled pieces 5, 6. The profiled pieces 5. 6 are identical and are shaped to define with the floor plate 4 guides 7 for the ends of the scrapers. The pan 1 is symmetrical about a longitudinal central plane with the profiled pieces 5, 6 arranged in mirror image on either side. The profiled pieces 5, 6 are manufactured by rolling. The profiled pieces 5, 6 possess substantially horizontal flanges 8 which lie at the top or bottom of the side walls and define part of the guides 7. As is known a machine may be supported on the upper most flanges 8 of one of the side walls. The flanges 8 each merge smoothly with a curved web or wall portion 9 angled off towards the center of the pan 1. The floor plate 4 extends between the portions 9 of the profiled pieces 5, 6 making up each side wall to space the pieces 5, 6 apart. The ends of the wall portions 9 are welded to the plate 4 with weld fillets or seams 10 extending longitudinally of the pan 1. The seams 10 lie within the guides 7 with the flanges 8 overlapping the seams 10 and the ends of the portions 9 to a considerable extent.

Each of the four profiled pieces 5, 6 also has a projection or rib 11 projecting outwardly from the side walls. Each rib 11 is generally aligned with the associated flange 8 and the ribs 11 merge into the junction zones between the flanges 8 and the curved wall portions 9. The flanges 8 of the profiled pieces 5, 6 are tapered or relieved to form shoulders 16 with the associated ribs 11.

As shown in FIGS. 2 and 3, on each of the extended side wall end regions there are complementary connectors 17. The connectors 17 are welded in place and can be made as drop foraging. The connectors 17 have laterally-open recesses 18 which define pockets for receiving a coupling member 19 (FIG. 3). In the construction represented in FIGS. 1 to 4, the connectors 17 are identical and are each welded between the ribs 11 of the profiled pieces 5, 6 of each side wall.

The connectors 17 have planar external faces 20 which lie in a substantially common plane with the end surfaces 14 of the ribs 11. The connectors 17 are shaped on their internal faces, i.e. opposite the faces 20, to rest snugly against the external faces of the wall portions 9 as can be seen in FIG. 4. As shown in FIGS. 2 and 3, the connectors 17 of abutting side walls of a pair of pans 1 are so arranged that the connector 17 of one pan (the left-hand one of these Figures) protrudes beyond the outer end 21 of the profile pieces 5, 6 while the other connector 17, (the right-hand one) is set back from the outer end 21 of the profiled pieces 5, 6 to the same extent as the protrusion. In this way the protruding part of the left-hand connector 17 fits into a corresponding space when the pans 1 are connected and the ends 21 of the respective profiled pieces 5, 6 engage. This provides rigidity and also assists in centering the pans 1 when they are being joined together.

FIG. 3 shows the two pans 1 when connected together with the coupling member 19 in place. The coupling member 19 seats snugly in the pockets 18 provided by the connectors 20 and does not protrude beyond the ribs 11. The coupling member 19 fits over a curved block 22 fitted on the right-hand connector 17 and is secured at the left-hand end with the aid of a securing element 23 which may be a screw-threaded component. Conveniently the securing element 23 is engaged in a bore in a spill-plate holder 12. A series of such holders 12 can be welded along one or both sides of the pan 1 in spaced-apart relationship as shown in FIG. 5. Each holder 12 is welded to the ribs 11 with the external faces 13 of the holders 12 lying substantially in a common vertical plane with the end surfaces 14 of the ribs 11. The inner faces of the holders 12 engage against the wall portions 9. The holders 12, which rigidify the structure, have recesses 15 one above another and open to one side. These recesses 15 receive the shanks of bolts (not shown) and the heads of these bolts are retained in pockets behind the holders 12. The bolts thus project outwardly from one or both sides of the pan 1 and serve to enable spill plates or other accessories to be fixed to the pans. The holders 12 can also be made as drop forgings.

The version represented in FIGS. 5 to 9 is similar to that represented in FIGS. 1 to 4 except for the design and arrangement of the connectors 17 and the coupling member 19. In the modified construction, the connectors 17 are not inserted into the shaped end regions of the side walls. Instead the connectors 17 are simply welded to the ends of the pans 1 in known manner. The connectors 17 have a height which corresponds to the side walls made up to the profiled pieces 5, 6. The connectors 17 at the respective ends are identical but transposed through 180°. The connectors 17 have above and below the pockets 18 and at the height of the flanges 8 narrow projections 24, 25 which project beyond the ends of the flanges 8 and overlap a shown in FIG. 8 to engage in complementary side recesses 26. The connectors 17 again receive a coupling member 19 secured with the aid of a securing element 29 which is passed through an opening in one of the holders 12. The element 29 has a bi-furcated projection 30 and a bolt 31 or the like engages in the projection 30 to pass through a slot 32 in a locking plate 33 which rests with its free end behind a projection 34 of the holder 12. The plate 33 and the projection 30 may be interconnected rigidly with a nut 35 fitted onto the bolt 31 to hold the element 29 in position. By releasing the nut the element 29 can be displaced (to the left of the illustration) so that the member 19 can be swivelled out of the pockets 18.

Figure 8:
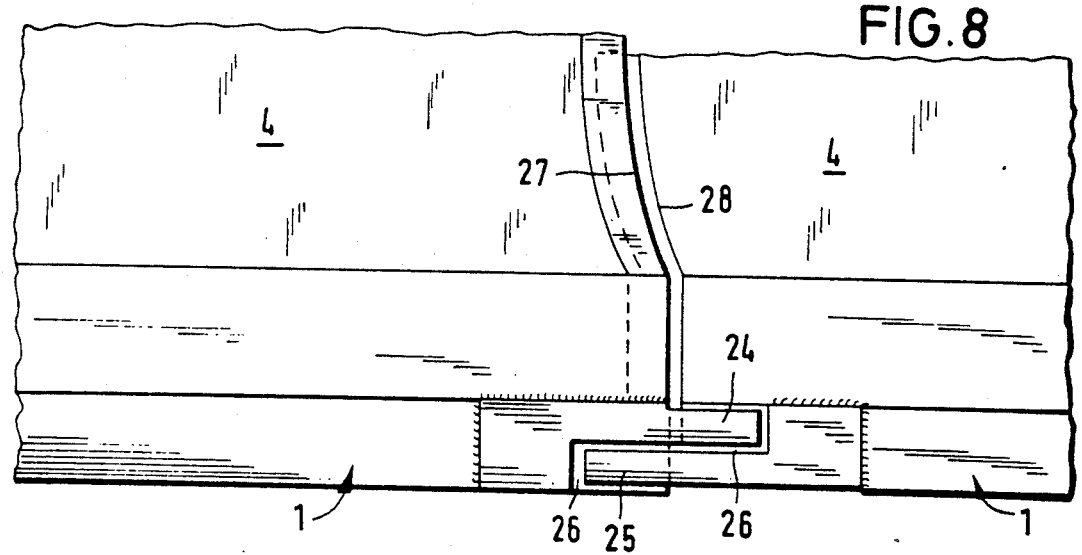
FIG. 8 is a plan view of part of the pans shown in FIG. 7 as viewed in the direction of arrow VIII in FIG. 7.
Figure 9:
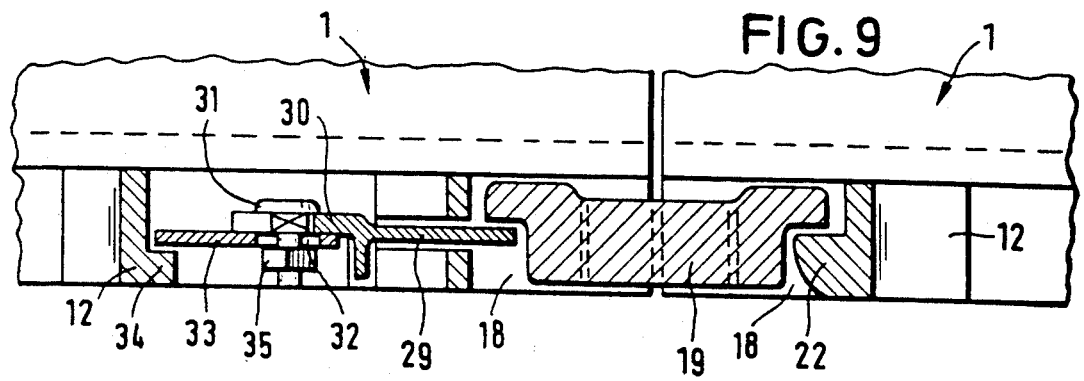
FIG. 9 is a sectional plan view of part of the pans shown in FIG. 7, and the view being taken along the line IX of FIG. 7.

As shown in FIGS. 6 and 8 the end regions 27, 28 of the plates 4 of the adjacent pans 1 are offset in thickness to partially overlap as butt joints. In addition these end regions are curved to facilitate the passage of the scraper-chain assembly.

We claim:

1. In a channel section or pan for a scraper-chain conveyor, the pan comprising side walls and a floor plate extending therebetween, each side wall being composed of upper and lower profiled pieces of identical shape each profiled piece having an inwardly directed flange disposed outwardly from the floor plate and an inclined wall portion projecting inwardly from the flange towards the floor plate and connectors at the ends of the side walls for enabling the pan to be connected to another pan; the improvement comprising the walls portions of the profiled pieces are curved, the floor plane locates between the profiled pieces of each side wall and is welded thereto with welded seams extending longitudinally to the pan joining the ends of the wall portions of the profiled pieces to the floor plate with the floor plate substantially not extending outwardly beyond the exterior of the wall portions of the profiled pieces and the profiled pieces have outwardly projecting ribs substantially in alignment with the flanges.

2. A pan according to claim 1, wherein holders for fitting accessories are provided at the exterior of at least one of this die walls, the holders being spaced apart along said wall nd being welded between the projecting ribs of the profiled pieces.

3. A pan according to claim 2, wherein the holders have external faces which lie in a substantially common vertical plane with end surfaces of the projecting ribs.

4. A pan according to claim 2, wherein the holders are shaped internally to match the exteriors of the wall portions of the profiled pieces of said wall.

5. A pan according to claim 2, wherein the holders each have recesses for receiving the shanks of bolts used to fit, said accessories.

6. A pan according to claim 1, wherein the flanges and the wall portions of the profiled pieces combine with the floor plate to define guides for scrapers of a scraper-chain assembly and the welded seams lie within the guides.

7. A pan according to claim 1, wherein the flanges of the profiled pieces form shoulders with the projecting ribs.

8. A pan according to claim 1, wherein the connectors define pockets for receiving detachable coupling members used to secure the ends of adjacent pans and the connectors are welded into the exterior of the side walls at end regions thereof between the projecting ribs of the profiled pieces.

9. A pan according to claim 8, wherein the external faces of the connectors lie substantially in a common plane with the end surfaces of the projecting ribs.

10. A pan according to claim 2 wherein the connectors define pockets for receiving detachable coupling members used to secure the ends of adjacent pans and the connectors are welded into the exterior of the side walls at end regions thereof between the projecting ribs of the profiled pieces, and wherein the connectors engage on some of the holders.

11. A pan according to claim 8 wherein the connectors are shaped internally to match the exteriors of the wall portions of the profiled pieces.

12. A pan according to claim 8, wherein the connectors are arranged so that at least one connector protrudes beyond the associated end of the side wall and another complementary connector is offset from the associated end of the side wall to create a space for receiving the protruding part of said one connector so that the respective connectors can inter-engage.

13. A pan according to claim 1, wherein the connectors are of identical construction.

14. A pan according to claim 1, wherein the connectors have complementary projections offset laterally of the pan so as to overlap at the end of adjacent pans.

15. A pan according to claim 1 wherein the connectors at the end of each side wall are identical but transposed through 180°.

16. A pan according to claim 1, wherein the connectors define pockets for receiving a detachable coupling member used to secure the ends of adjacent pans and wherein, the connectors are fixed to the ends of the side walls and have a height which is substantially the same as the side walls.

* * * * *